United States Patent
Blake et al.

(10) Patent No.: US 10,628,314 B2
(45) Date of Patent: *Apr. 21, 2020

(54) DUAL CLUSTERS OF FULLY CONNECTED INTEGRATED CIRCUIT MULTIPROCESSORS WITH SHARED HIGH-LEVEL CACHE

(71) Applicant: International Business Machines Corporation, Armonk, NY (US)

(72) Inventors: Michael A. Blake, Wappingers Falls, NY (US); Timothy C. Bronson, Round Rock, TX (US); Pak-kin Mak, Poughkeepsie, NY (US); Vesselina K. Papazova, Highland, NY (US); Robert J. Sonnelitter, III, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,369

(22) Filed: Nov. 1, 2017

(65) Prior Publication Data

US 2018/0341587 A1 Nov. 29, 2018

Related U.S. Application Data

(63) Continuation of application No. 15/606,055, filed on May 26, 2017.

(51) Int. Cl.
*G06F 12/084* (2016.01)
*G06F 12/0862* (2016.01)
(Continued)

(52) U.S. Cl.
CPC ........ *G06F 12/084* (2013.01); *G06F 12/0811* (2013.01); *G06F 12/0813* (2013.01);
(Continued)

(58) Field of Classification Search
CPC ......... G06F 17/30224; G06F 17/30132; G06F 12/0893; G06F 9/30047; G06F 9/524;
(Continued)

(56) References Cited

U.S. PATENT DOCUMENTS 6,738,870 B2 * 5/2004 Van Huben ....... G06F 15/17381
711/124
8,719,520 B1 * 5/2014 Piszczek ............. G06F 11/1076
709/219

(Continued)

FOREIGN PATENT DOCUMENTS

EP 1408416 A2 4/2004
WO 9120033 A1 12/1991

OTHER PUBLICATIONS

List of IBM Patents or Patent Applications Treated as Related; Date Filed: Nov. 1, 2017, p. 1-2.
(Continued)

*Primary Examiner* — Adam M Queler
*Assistant Examiner* — Alex G Olson
(74) *Attorney, Agent, or Firm* — Cantor Colburn LLP; William Kinnaman

(57) ABSTRACT

Embodiments of the present invention are directed to managing a shared high-level cache for dual clusters of fully connected integrated circuit multiprocessors. An example of a computer-implemented method includes: providing a drawer comprising a plurality of clusters, each of the plurality of clusters comprising a plurality of processors; providing a shared cache integrated circuit to manage a shared cache memory among the plurality of clusters; receiving, by
(Continued)

the shared cache integrated circuit, an operation of one of a plurality of operation types from one of the plurality of processors; and processing, by the shared cache integrated circuit, the operation based at least in part on the operation type of the operation according to a set of rules for processing the operation type.

6 Claims, 5 Drawing Sheets

(51) Int. Cl.
  *G06F 12/0813* (2016.01)
  *G06F 12/0811* (2016.01)
  *G06F 12/0817* (2016.01)
(52) U.S. Cl.
  CPC ...... *G06F 12/0826* (2013.01); *G06F 12/0862* (2013.01); *G06F 2212/1024* (2013.01); *G06F 2212/314* (2013.01); *G06F 2212/602* (2013.01)
(58) Field of Classification Search
  CPC ....... G06F 2009/45583; G06F 12/0811; G06F 12/084; G06F 12/0897; G06F 12/0806; G06F 2212/283; G06F 12/0815; G06F 12/0875; G06F 9/3891; G06F 2212/621; G06F 12/0833
  See application file for complete search history.

(56) References Cited

U.S. PATENT DOCUMENTS

| | | | | |
|---|---|---|---|---|
| 9,860,333 | B2* | 1/2018 | Ananthanarayanan | G06F 17/30224 |
| 2002/0083149 | A1* | 6/2002 | Van Huben | G06F 15/17381 709/215 |
| 2002/0083243 | A1* | 6/2002 | Van Huben | G06F 9/524 710/107 |
| 2002/0083299 | A1* | 6/2002 | Van Huben | G06F 15/17381 712/29 |
| 2006/0271742 | A1* | 11/2006 | Clark | G06F 12/0817 711/141 |
| 2007/0073974 | A1* | 3/2007 | Averill | G06F 12/128 711/133 |
| 2007/0266205 | A1* | 11/2007 | Bevilacqua | G06F 3/0605 711/114 |
| 2010/0070712 | A1 | 3/2010 | Arimillie et al. | |
| 2011/0145367 | A1* | 6/2011 | Ananthanarayanan | G06F 17/30224 709/219 |
| 2013/0339609 | A1 | 12/2013 | Bronson et al. | |
| 2014/0181837 | A1* | 6/2014 | Vajapeyam | G06F 9/4856 718/107 |
| 2014/0258621 | A1 | 9/2014 | Bronson et al. | |
| 2014/0325262 | A1* | 10/2014 | Cooper | G06F 11/108 714/6.22 |
| 2015/0178205 | A1* | 6/2015 | Guthrie | G06F 13/362 711/141 |
| 2015/0178209 | A1* | 6/2015 | Hollaway, Jr. | G06F 12/0831 711/146 |
| 2015/0205668 | A1* | 7/2015 | Sundaram | G11C 29/52 714/6.24 |
| 2016/0110288 | A1 | 4/2016 | Bronson et al. | |
| 2016/0147658 | A1 | 5/2016 | Ambroladze et al. | |
| 2016/0147659 | A1 | 5/2016 | Drapala et al. | |
| 2016/0147666 | A1* | 5/2016 | Li | G06F 12/0897 711/122 |
| 2016/0232107 | A1* | 8/2016 | Ros | G06F 12/1045 |
| 2016/0327999 | A1* | 11/2016 | Chang | G06F 1/3296 |
| 2017/0024329 | A1 | 1/2017 | Ishii | |
| 2018/0341586 | A1 | 11/2018 | Blake et al. | |

OTHER PUBLICATIONS

Michael A. Blake, et al.,"Dual Clusters of Fully Connected Integrated Circuit Multiprocessors With Shared High-Level Cache", U.S. Appl. No. 15/606,055, filed May 26, 2017.

Fang, Zhen, et al., "Fast Synchronization on Shared-Memory multiprocessors: An Architectural Approach" https://www.cs.utah.edu/~retrac/papers/jpdc05.pdf; May 11, 2008; pp. 1-21.

* cited by examiner

DUAL CLUSTERS OF FULLY CONNECTED INTEGRATED CIRCUIT MULTIPROCESSORS WITH SHARED HIGH-LEVEL CACHE

This application is a continuation of U.S. patent application Ser. No. 15/606,055, entitled "DUAL CLUSTERS OF FULLY CONNECTED INTEGRATED CIRCUIT MULTIPROCESSORS WITH SHARED HIGH-LEVEL CACHE," filed May 26, 2017, the disclosure of which is incorporated by reference herein in its entirety.

BACKGROUND

The present invention generally relates to computer system design, and more specifically, to a managing a shared high-level cache for dual clusters of fully connected integrated circuit multiprocessors.

Symmetric multiprocessing (SMP) systems utilize a multiprocessor hardware and software architecture. Two or more processors are connected to a single, shared main memory. For example, an SMP system can have a centralized shared memory that operates using a single operating system with two or more processors. Each processor can utilize its own cache memory (or simply "cache") to speed up data access to the shared memory and to reduce the system bus traffic. Some SMP systems can utilize multiple cache memories and/or multiple levels of cache memory that may be shared between and among various processors.

SUMMARY

Embodiments of the present invention are directed to a computer-implemented method for managing a shared high-level cache for dual clusters of fully connected integrated circuit multiprocessors. An example of a computer-implemented method includes: providing a drawer comprising a plurality of clusters, each of the plurality of clusters comprising a plurality of processors; providing a shared cache integrated circuit to manage a shared cache memory among the plurality of clusters; receiving, by the shared cache integrated circuit, an operation of one of a plurality of operation types from one of the plurality of processors; and processing, by the shared cache integrated circuit, the operation based at least in part on the operation type of the operation according to a set of rules for processing the operation type.

Embodiments of the present invention are also directed to a system comprising a drawer comprising a plurality of clusters, each of the plurality of clusters comprising a plurality of processors; and a shared cache integrated circuit to manage a shared cache memory among the plurality of clusters, wherein the shared cache integrated circuit is configured to store computer readable instructions and execute the computer readable instructions for performing a method, the method comprising: receiving, by the shared cache integrated circuit, an operation of one of a plurality of operation types from one of the plurality of processors, and processing, by the shared cache integrated circuit, the operation based at least in part on the operation type of the operation according to a set of rules for processing the operation type.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
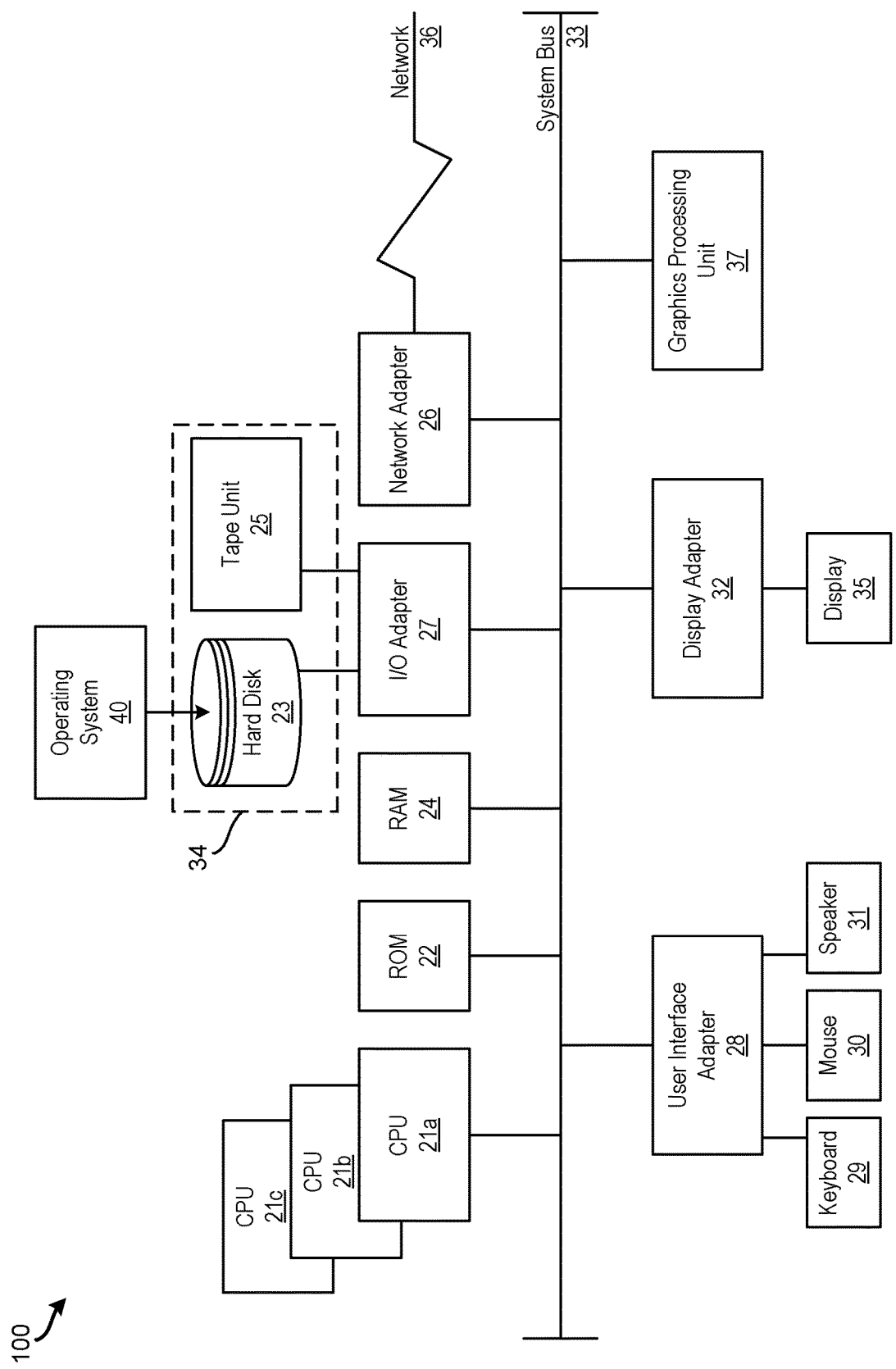
FIG. 1 depicts a processing system for implementing the techniques described herein according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood that embodiments of the present invention are capable of being implemented in conjunction with any other suitable type of computing environment now known or later developed. For example, FIG. 1 depicts a block diagram of a processing system 100 for implementing the techniques described herein. In examples, processing system 100 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 100.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 100 may be stored in mass storage 34. A network adapter 26 interconnects system bus 33 with an outside network 36 enabling processing system 100 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in the processing system 100.

Turning now to an overview of technologies that are more specifically relevant to aspects of the invention, highly distributed, large symmetric multiprocessing (SMP) systems utilize can share high-level cache (e.g., L4 cache). Prior SMP systems required tradeoffs to be made between the amount of available L4 cache and the level of connectivity between processors to accommodate cost and packaging constraints. Existing SMP systems can include multiple drawers, where each drawer contains two independent and separate nodes. These nodes in turn each contain multiple central processing (CP) chips (e.g., integrated circuits) connected together with a dedicated shared cache (SC) chip. Each CP chip is a chip multiprocessor (CMP) with a private L1 and L2 cache per processor and one L3 cache shared by all the processors on the chip. The SC chip includes an L4 cache and system interconnect logic.

A drawer of an SMP system can include clusters of CP chips. For example, an SMP system can include one or more drawers, and each drawer can include two clusters of CP chips (referred to as "CP clusters"). Each of the CP clusters is connected to each other to provide on-drawer node-to-node communication, and also to one of the SC chips on each of the other drawers in the SMP system. Existing SMP systems with two independent nodes per drawer, each with its own SC chip, maximize the amount of available L4 cache and simplify the SC chip internal design point with regard to communications with the attached CP chips. The attached CP chips in a node are fully connected to each other and also to the SC chip in the respective node. Operations originating in any of the CP chips are broadcast to all the other CP chips and the SC chip. Many operations can be completed within the node (e.g., a read only fetch operation that hits in the L4 cache). While existing SMP systems can fulfill these operations, any operation that interrogates processors outside of the requesting node (e.g., a fetch exclusive that hits in the L4 cache) but observes that the line is shared by another node must traverse both SC chips to interrogate the other CP cluster in the drawer, and if it must leave the drawer, this same additional SC chip crossing is made in every drawer. A workload that can be handled by the processors and memory within a single node then performs well on existing SMP systems. However, workloads that require more processors and/or memory in a single node can be contained within a single drawer, but in prior SMP systems, these workloads frequently encountered the added latency imposed by two SC chip crossings to interrogate the caches on the other node in the drawer.

Turning now to an overview of the aspects of the invention, one or more embodiments of the invention address the above-described shortcomings of the prior art by reducing inter-cluster latencies by using a single SC chip. The single SC chip has a view of the cache on each CP cluster. Accordingly, the single SC chip reduces latency that more than makes up for any resultant reduction in L4 cache size (as compared to two SC chips).

The embodiments of the present invention utilize SMP system drawers that contain two clusters of CP chips connected by a single SC chip. This may be referred to as dual CP clusters of fully connected chip multiprocessors with the shared high-level cache. Each CP in a cluster is connected to every other CP chip in the CP cluster and to the SC chip. The SC chip is directly connected to each of the CP chips in both CP clusters; however, no direct connection exists between chips of one CP cluster and chips of the other cluster.

To implement a single SC chip architecture in an SMP system, an L4 cache directory state in the SC chip tracks cache lines contained in each CP cluster. Indicators for local intervention master (LIM), exclusive (EX), and ownership vector are used to track a state within both CP clusters. These indicators can be implemented in addition to conventional indicators used to track global states of cache lines relative to other drawers in the SMP system, for example.

The above-described aspects of the invention address the shortcomings of the prior art by reducing latency within SMP systems. For example, by using a single SC chip connected to each of the CP chips in both CP clusters, on drawer latency between the CP chips in different CP clusters is reduced. Latency can also be reduced by snooping in a single cache directory as opposed to sequentially snooping two cache directories in two separate SC chips as in previous SMP systems with dual SC chips per drawer. The latency reduction provides significant performance improvement in SMP systems.

Figure 2:
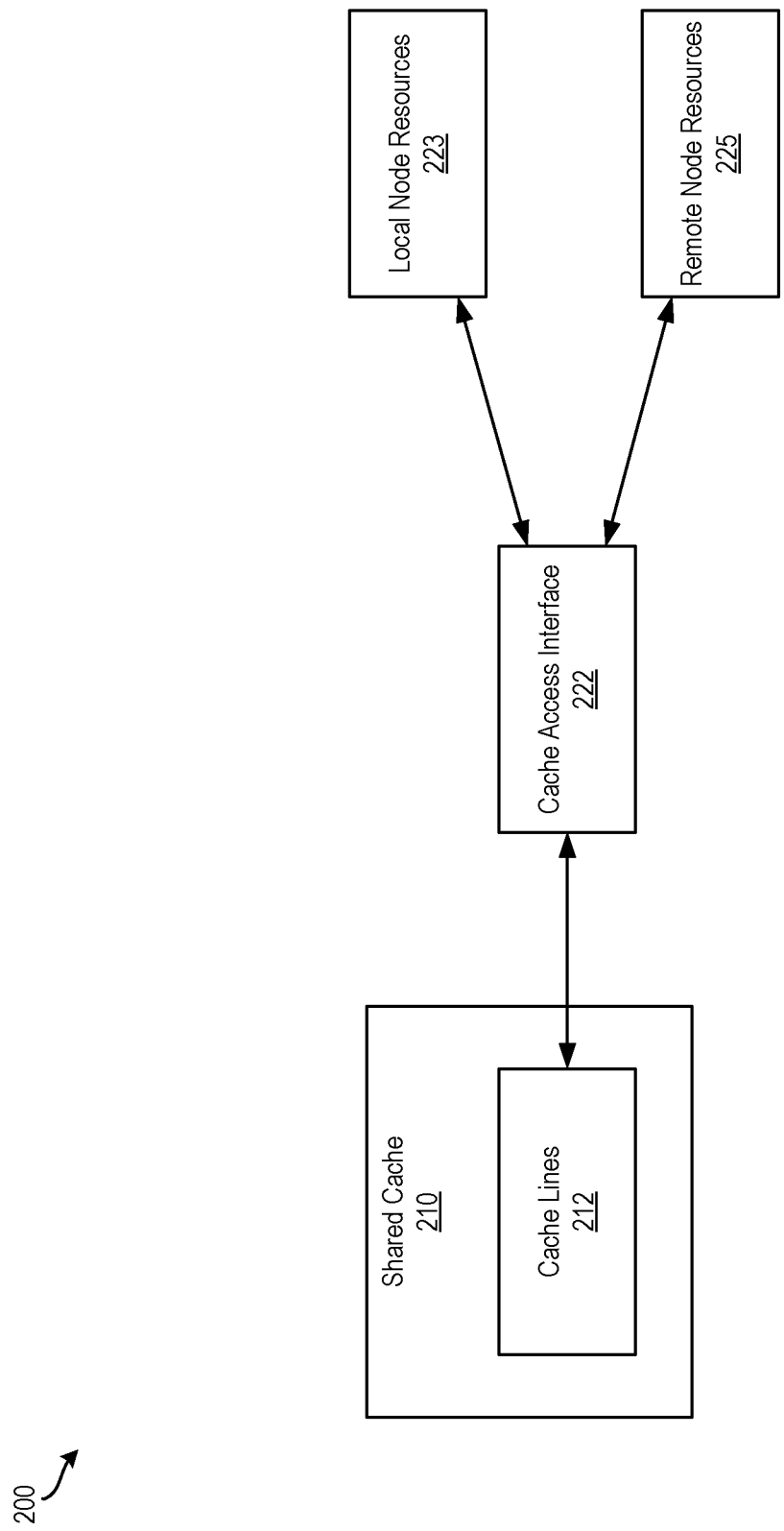
FIG. 2 depicts a node of a multi-node processing system according to embodiments of the present invention.

Turning now to a more detailed description of aspects of the present invention, FIG. 2 depicts a node 200 of a multi-node processing system according to embodiments of the invention. The node 200 can be a portion of a symmetric multiprocessing (SMP) system, for example, or another suitable type of processing system.

The node 200 includes a shared cache 210 that is shared by local node resources 223 and remote node resources 225 configured and arranged as shown. The local node resources 223 access cache lines 212 in the shared cache 210 via a cache access interface 222. Similarly, the remote node resources 225 access cache lines 212 via the cache access interface 222.

Figure 3:
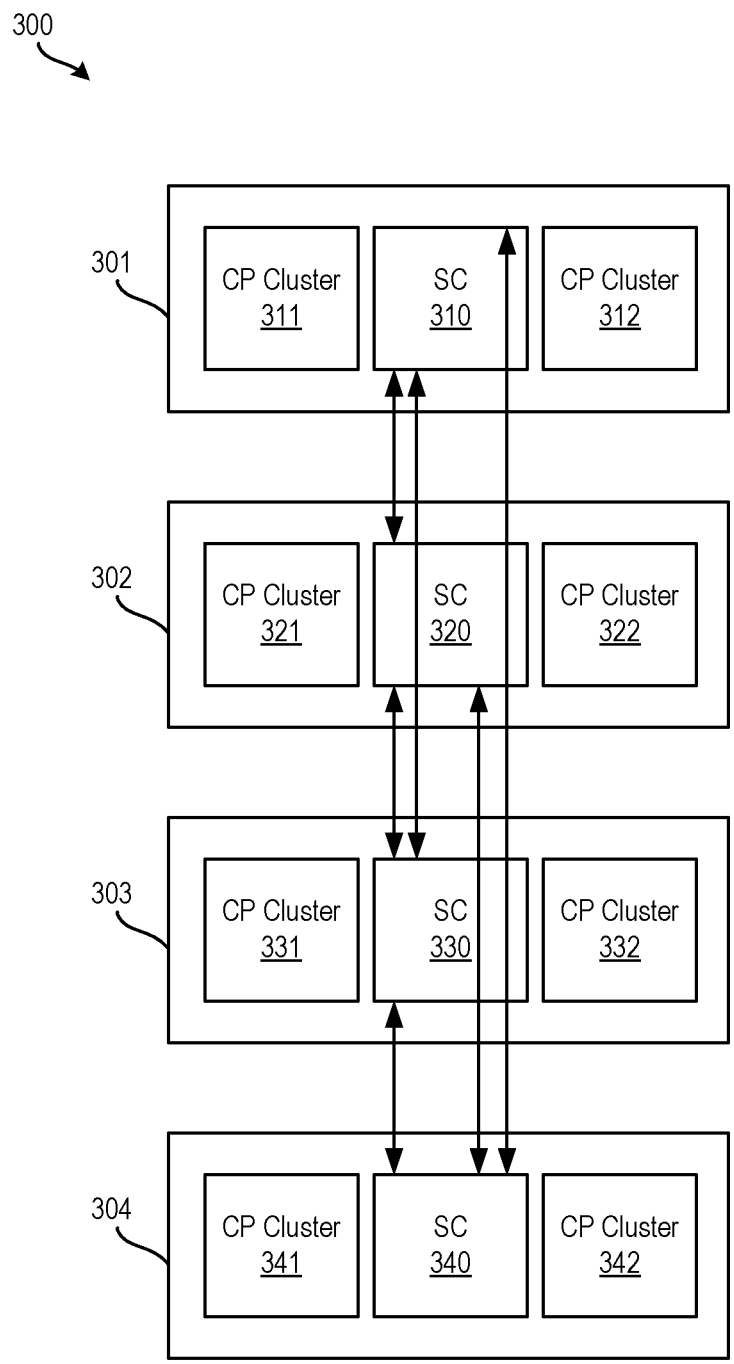
FIG. 3 depicts a multi-node processing system according to embodiments of the present invention.

FIG. 3 depicts a multi-node processing system 300 including a plurality of interconnected drawers 301, 302, 303, 304 according to embodiments of the present invention. Each of the drawers 301-304 includes two central processor (CP) clusters and a shared cache (SC) chip configured and arranged as shown. For example, the drawer 301 includes a CP cluster 311, a CP cluster 312, and an SC 310; the drawer 302 includes a CP cluster 321, a CP cluster 322, and an SC 320; the drawer 302 includes a CP cluster 331, a CP cluster 332, and an SC 330; and the drawer 304 includes a CP cluster 341, a CP cluster 342, and an SC 340.

As shown in FIG. 3, each of the SC chips 310, 320, 330, 340 are fully interconnected. That is, SC 310 is communicatively connected directly to SC 320, 330, 340; SC 320 is communicatively connected directly to SC 310, 330, 340; SC 330 is communicatively connected directly to SC 310, 320, 340; and SC 340 is communicatively connected directly to SC 310, 320, 330. Although not shown, each SC 310, 320, 330, 340 is also communicatively connected to its respective CP clusters (e.g., the SC 310 is communicatively connected to the CP cluster 311 and the CP cluster 312, the SC 320 is communicatively connected to the CP cluster 321 and the CP cluster 322, etc.). Additionally, each SC 310, 320, 330, 340 includes an L4 cache (not shown).

Figure 4:
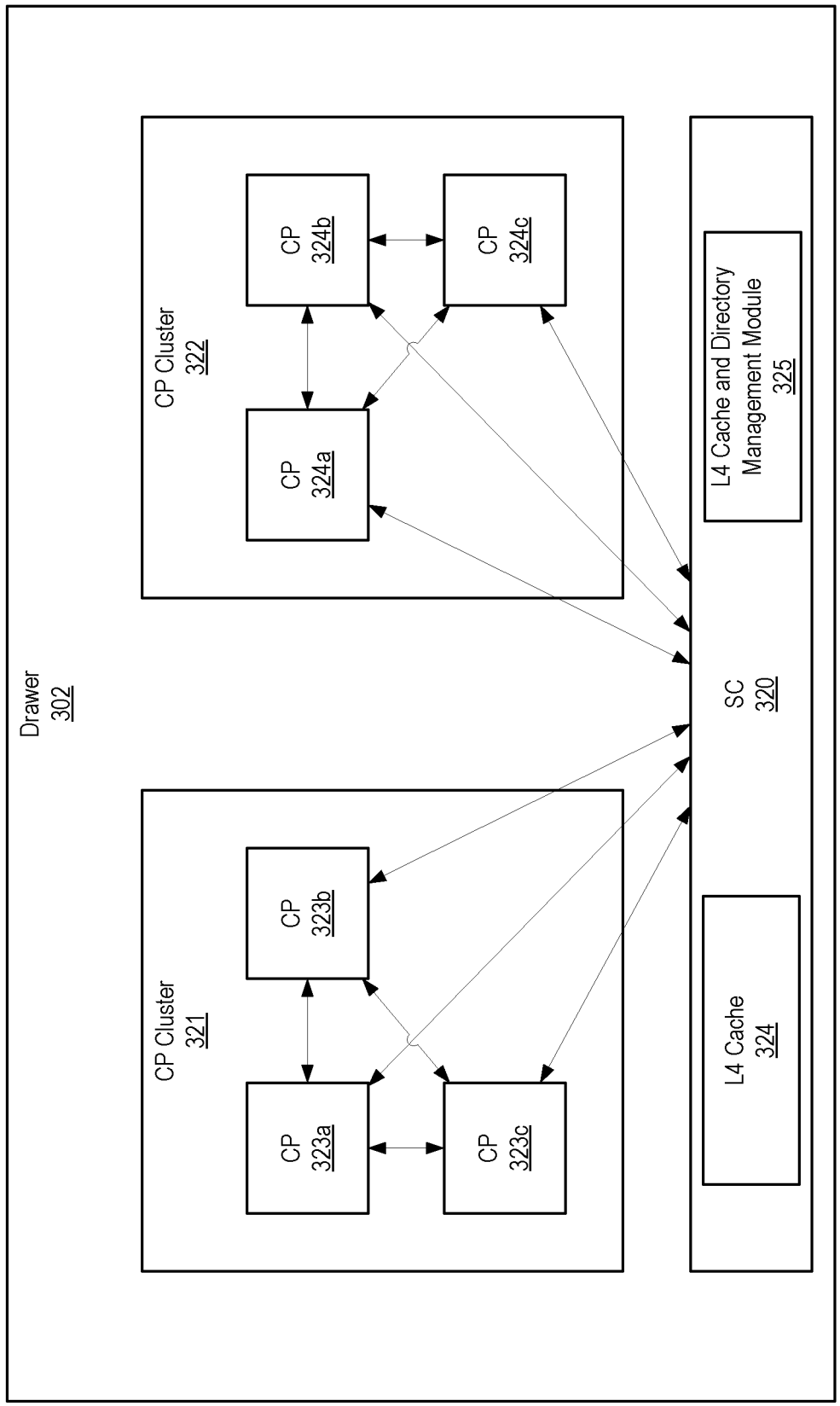
FIG. 4 depicts a drawer of the multi-node processing system of FIG. 3 according to embodiments of the present invention.

FIG. 4 depicts a drawer 302 of the multi-node processing system 300 of FIG. 3 according to embodiments of the present invention. The drawer 302 includes two CP clusters (e.g., CP cluster 321 and CP cluster 322). Each CP cluster contains individual CP chips. For example, CP cluster 321 contains CP chips 323a, 323b, 323c; and CP cluster 322 contains CP chips 324a, 324b, 324c. Each of the individual CP chips (e.g., CP chips 323a, 323b, 323c, 324a, 324b, 324c) has multiple processing cores (e.g., 2 processing cores, 8 processing cores, 10 processing cores, etc.) and each processing core has its own private L1 and L2 cache. The processing cores within each individual CP chip share an L3 cache at the CP level. For example, the CP 323a includes multiple processing cores that each has its own L1/L2 cache, and the multiple processing cores within the CP 323a share an L3 cache.

The SC 320 includes interconnects for communication with each CP chip (e.g., CP chips 323a, 323b, 323c, 324a, 324b, 324c) in both clusters 321, 322 on the drawer 303 and for communication with other SC chips on other drawers (e.g., the SC 310 of the drawer 301, the SC 330 of the drawer 303, the SC 340 of the drawer 304, etc.).

The SC 320 also includes an L4 cache 324 and directory that includes the L4 cache and a directory of state bits. For example, the state bits can include the following: Global Intervention Master (GIM), which indicates which drawer is the intervention master for inter-drawer operations; Global Multi-Copy (GMC), which indicates that the cache line may exist on one or more other drawers; Cluster 0 (e.g., CP cluster 321) L4 Local Intervention Master (Cls0 L4 LIM), which indicates that the L4 cache will source data for fetches initiated on cluster 0 if set, otherwise one of the L3's in cluster 0 is the intervention master if the cache line is a hit; Cluster 1 (e.g., CP cluster 322) L4 Local Intervention Master (Cls1 L4 LIM), which indicates that the L4 cache will source data for fetches initiated on cluster 1 if set, otherwise one of the L3's in cluster 1 is the intervention master if the line is a hit; Cluster 0 L3 Exclusive (Cls0 L3 EX), which indicates that one or more of the L3's in cluster 0 may contain newer data than what is currently contained in the L4 cache (no CP's in cluster 1 can have a copy of the line when this bit is set); Cluster 1 L3 Exclusive (Cls1 L3 EX), which indicates that one or more of the L3's in cluster 1 may contain newer data than what is currently contained in the L4 cache (no CP's in cluster 0 can have a copy of the line when this bit is set); Cls0 L3 Ownership Vector, which indicates which of the L3's in cluster 0 contain a copy of the cache line; Cls1 L3 Ownership Vector, which indicates which of the L3's in cluster 1 contain a copy of the cache line; and L4 Changed Line (L4 CL), which indicates that the data in the L4 cache is changed relative to system memory.

The directory states provide for cluster specific local intervention master. For example, an L4 intervention master (LIM) to be set to indicate that L4 cache is the data source for fetches. For example, if a fetch is received, the LIM designates which CP cluster provides data and provides "exclusive" cache access. The directory states also provide for cluster specific L3 exclusive bits to indicate that one or more CPs in a cluster may have changed data relative to the L4 cache. Clusters can specify ownership vectors to track ownership both per CP and per CP cluster. The single directory tracks states for two independent clusters (e.g., the CP cluster 321 and the CP cluster 322).

The SC 320 also includes an L4 directory and cache management module 325 (hereinafter "module 325"). The module 325 allows for multiple intervention masters, understands when cross cluster interrogation is needed, understands when cross cluster invalidation is needed, understands when cross cluster memory fetch is needed, accurately predicts data source (and target for stores), and tracks potential changed data in L3 caches in one of the clusters (e.g., the CP cluster 321 or the CP cluster 322).

Module 325 includes logic for implementing rules for various operations. For example, fetch-type operations and input/output (I/O) store-type operations can be treated differently and different rules apply to each.

For fetch-type operations, the module 325 can implement the following. As a result of an initial fetch broadcast by the CP 323a (for example) of the CP cluster 321, the CP cluster 321 L3 LIM (if present) supplies data. The CP cluster 321 target memory (if present) speculatively supplies data if no LIM in the CP cluster 321 exists. The SC 320 supplies data from L4 cache 324 if it is L4 LIM and no L3 EX owner exists in the CP cluster 322. The CP cluster 321 L3 non-requesting owners of a cache line invalidate their respective copies upon receipt of a fetch exclusive or fetch with intent to modify.

Continuing with fetch-type operations, the SC 320 initiates a command broadcast to the CP cluster 322 when necessary. When the CP cluster 322 is in L3 EX state, it is indicated that an L3 in the CP cluster 322 contains newer data than what is in the L4 cache. In such cases, the CP cluster 322 supplies intervention data only if its copy in L3 cache has been changed relative to the L4 cache 324. The SC 320 returns the intervention data from the CP cluster 322 (if any) to the CP cluster 321 requester (e.g., the CP 323a) and updates data in the L4 cache 324. If the CP cluster 322 contains the target memory and the cache line misses the L4 cache 324, the SC 320 supplies fetch data from the CP cluster 322 to the CP cluster 321 requester (e.g., the CP 323a) and adds it to the L4 cache. When the CP cluster 322 contains a copy of the cache line in any state and the operation is fetch-exclusive (FEX), the SC 320 broadcasts an invalidate or interrogate command depending on the EX bit of the CP cluster 322. For example, an invalidate command is broadcasted to the CP cluster 322 if the CP cluster 322's EX bit is off (not set), and an interrogate command is broadcasted to the CP cluster 322 if the CP cluster 322's EX bit is on (set).

Still continuing with fetch-type operations, the SC 320 can update the L4 cache 324 and directory. For example, the ownership bit is set for the requesting CP, the CP cluster 321 L4 LIM is reset (if on initially), the CP cluster 321 L3 EX bit is set for FEX operations, the CP cluster 322 is set for FEX operations, the CP cluster 322 EX status is reset (if on initially), and the ownership bits are turned off for all but the requesting CP for FEX operations.

For I/O store type operations, the module 325 can implement the following rules for various operations. As a result of an initial I/O store type operation by a requester CP (e.g., the CP 323a) in the CP cluster 321, a target memory chip in the CP cluster 321 manages the I/O store sequence to memory if the cache line does not exist in the GIM state in the L4 cache.

The SC 320 initiates a command broadcast to the CP cluster 321 when appropriate. For example, if the target cache lines hits any L3 in the CP cluster 321, the SC 320 sends an invalidate command to the CP cluster 321. If the CP cluster 321 contains a target memory and it is not the requesting chip, and the line does not exist in the GIM state in the L4 cache, the SC 320 manages the I/O store sequence to the L3 memory in the CP cluster 321.

Similarly, the SC 320 initiates a command broadcast to the CP cluster 322 when appropriate. For example, if the target cache line hits in any L3 in the CP cluster 322, then the SC sends an invalidate command to the CP cluster 322. If the CP cluster 322 contains the memory and the cache line does not exist in the GIM state in the L4 cache, then the SC 320 manages the I/O store sequence to the CP cluster 322.

For I/O store type operations, the SC 320 updates the L4 cache directory as necessary. The ownership bit is turned off for each of the CPs, the L4 LIM bits are set if the cache line exists GIM in the L4 (e.g., the I/O store sequence is completed to the L4 cache), and the L4 directory bits are reset (i.e., the cache line is invalidated) if the cache line is not GIM initially.

This dual cluster topology provides several benefits. For example, the CPs in a given cluster are fully interconnected with each other and with the SC chip. Inter-cluster communication flows through one SC chip (e.g., the SC 320) and snoops one L4 directory (e.g., the L4 cache 324 and directory). The L4 cache 324 and directory is inclusive of all caches in both clusters (e.g., CP cluster 321 and CP cluster 322). CP initiated operations are broadcast to all CP's in a requester's cluster and to the SC 320. The SC 320 then initiates a broadcast to the other cluster only when needed. This is referred to as "snoop filtering."

Figure 5:
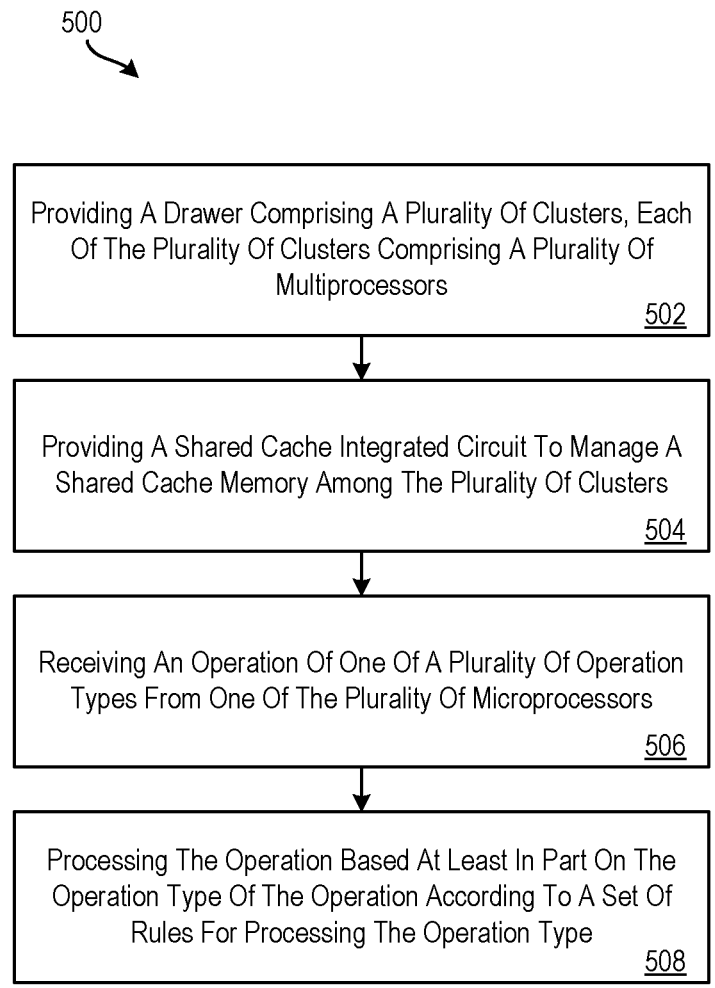
FIG. 5 depicts a flow diagram of a method for managing a shared high-level cache for dual clusters of fully connected integrated circuit multiprocessors according to examples of the present disclosure.

FIG. 5 depicts a flow diagram of a method 500 for managing a shared high-level cache for dual clusters of fully connected integrated circuit multiprocessors according to examples of the present disclosure. The method 500 can be implemented on a suitable processing system, such as the processing system 100, the multi-node processing system 200, the multi-node processing system 300, or another suitable processing system.

With reference to FIG. 4, the method 500 can occur as follows. At block 502, a drawer 302 is provided. The drawer 302 includes a plurality of clusters (e.g., the CP cluster 321 and the CP cluster 322). Each of the plurality of clusters includes a plurality of processors. For example, the CP cluster 321 includes CPs 323a, 323b, 323c and the CP cluster 322 includes CPs 324a, 324b, 324c. The processors (e.g., the CPs) can be multiprocessors. According to some examples, each of the processors is connected to each of the other of the processors within its respective cluster. For example, the CP 324a is connected to the CP 324b and the CP 324c. According to some examples, each of the processors is connected to the shared cache. For example, each of the CPs 323a, 323b, 323c, 324a, 324b, 324c is connected to the SC 320.

At block 504, a shared cache integrated circuit (e.g., SC 320) is provided to manage a shared cache memory (e.g., L4 cache 324) among the plurality of clusters. The SC 320 can include a directory to store directory state bits as described herein. The directory state bits are used to process operations according to sets of rules for processing the operation based on a type of the operation.

At block 506, the shared cache integrated circuit receives an operation of one of a plurality of operation types from one of the plurality of processors. The operation types can include a fetch type operation, an input/output store type operation or any other suitable operation.

At block 508, the shared cache integrated circuit processes the operation based at least in part on the operation type of the operation according to a set of rules for processing the operation type. As described herein, different rules can be applied depending on the operation type in order to process the operation.

Additional processes also may be included, and it should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    providing a drawer comprising a plurality of clusters, each of the plurality of clusters comprising a plurality of processors, each of the plurality of processors comprising a plurality of processing cores, each processing core of the plurality of processing cores having a private Level 1 cache and a private Level 2 cache per processing core, the plurality of processing cores within each of the plurality of clusters sharing a shared Level 3 cache;
    providing a single shared cache integrated circuit to manage a shared Level 4 cache memory among the plurality of clusters, the single shared cache integrated circuit comprising the shared Level 4 cache memory and a directory to store a plurality of directory state bits;
    receiving, by the single shared cache integrated circuit, an operation of one of a plurality of operation types from one of the plurality of processors; and
    processing, by the single shared cache integrated circuit, the operation based at least in part on the operation type of the operation according to a set of rules for processing the operation type, wherein the directory state bits are used to process the operation according to the set of rules for processing the operation type,
    wherein the operation type is an input/output store type operation, and wherein the set of rules for processing the input/output store type operation comprise:
        responsive to receiving the input/output store type operation by a requester processor of the plurality of processors, managing, by a target memory chip in a first cluster of the plurality of clusters, an input/output store sequence to memory responsive to a cache line not existing in a global intervention master state of the directory state bits;
        selectively initiating, by the single shared cache integrated circuit, a first command broadcast to the first cluster, the selectively initiating being based on a determination that a target cache line hits any of the Level 3 caches in the first cluster, the first command broadcast being a first invalidate command sent to the first cluster;
        selectively initiating, by the single shared cache integrated circuit, a second command broadcast to a second cluster of the plurality of clusters, the selectively initiating being based on a determination that a target cache line hits any of the Level 3 caches in the second cluster, the second command broadcast being a second invalidate command sent to the second cluster; and
        updating the directory.

2. The computer-implemented method of claim 1, wherein each of the plurality of processors is connected to the single shared cache integrated circuit.

3. The computer-implemented method of claim 1, wherein each of the plurality of processors is connected to each of the other of the plurality of processors within its cluster.

4. A computer-implemented method comprising:
    providing a drawer comprising a plurality of clusters, each of the plurality of clusters comprising a plurality of processors, each of the plurality of processors comprising a plurality of processing cores, each processing core of the plurality of processing cores having a private Level 1 cache and a private Level 2 cache per processing core, the plurality of processing cores within each of the plurality of clusters sharing a shared Level 3 cache;
    providing a single shared cache integrated circuit to manage a shared Level 4 cache memory among the plurality of clusters, the single shared cache integrated circuit comprising the shared Level 4 cache memory and a directory to store a plurality of directory state bits;
    receiving, by the single shared cache integrated circuit, an operation of one of a plurality of operation types from one of the plurality of processors; and
    processing, by the single shared cache integrated circuit, the operation based at least in part on the operation type of the operation according to a set of rules for processing the operation type, wherein the directory state bits are used to process the operation according to the set of rules for processing the operation type,
    wherein the operation type is a fetch type operation, and wherein the set of rules for processing the fetch type operation comprise:
        responsive to receiving the fetch type operation by a requester processor of the plurality of processors, providing, by a first cluster of the plurality of clusters, data;
        invalidating, by non-requester processors of the plurality of processors, their respective copies of the data responsive to the fetch type operation being a fetch exclusive command;
        selectively initiating, by the single shared cache integrated circuit, a command broadcast to a second cluster of the plurality of clusters; and
        updating the Level 4 cache memory and the directory.

5. The computer-implemented method of claim 4, wherein each of the plurality of processors is connected to the single shared cache integrated circuit.

6. The computer-implemented method of claim 4, wherein each of the plurality of processors is connected to each of the other of the plurality of processors within its cluster.

\* \* \* \* \*